US008120599B2

(12) United States Patent
Kang et al.

(10) Patent No.: US 8,120,599 B2
(45) Date of Patent: Feb. 21, 2012

(54) METHOD OF AUTOMATICALLY RECOVERING BIT VALUES OF CONTROL REGISTER AND LCD DRIVE INTEGRATED CIRCUIT FOR PERFORMING THE SAME

(75) Inventors: Won-sik Kang, Seoul (KR); Jae-goo Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1175 days.

(21) Appl. No.: 11/866,650

(22) Filed: Oct. 3, 2007

(65) Prior Publication Data

US 2008/0084406 A1 Apr. 10, 2008

(30) Foreign Application Priority Data

Oct. 10, 2006 (KR) ........................ 10-2006-0098645

(51) Int. Cl.
*G06F 3/038* (2006.01)
*G09G 5/00* (2006.01)

(52) U.S. Cl. .......... 345/204; 345/87; 345/100; 345/531; 345/537; 345/534

(58) Field of Classification Search .................. 345/559, 345/204–206, 87–90, 98–100, 530–534, 345/536–538
See application file for complete search history.

(56) References Cited

U.S. PATENT DOCUMENTS

| | | | | |
|---|---|---|---|---|
| 6,483,497 | B1 * | 11/2002 | Iino et al. | 345/100 |
| 7,446,776 | B2 * | 11/2008 | Clewett et al. | 345/530 |
| 2003/0034948 | A1 * | 2/2003 | Imamura | 345/98 |
| 2003/0189539 | A1 * | 10/2003 | Tamura | 345/89 |

FOREIGN PATENT DOCUMENTS

| | | | |
|---|---|---|---|
| JP | 2003-263133 | | 9/2003 |
| JP | 2003263133 | * | 9/2003 |
| JP | 2005-195746 | * | 7/2005 |
| KR | 1020050122501 | | 12/2005 |

* cited by examiner

*Primary Examiner* — Lun-Yi Lao
*Assistant Examiner* — Kelly B Hegarty
(74) *Attorney, Agent, or Firm* — F. Chau & Associates, LLC

(57) ABSTRACT

A method of automatically recovering bit values of a control register includes storing command data inputted from a host in the control register and a portion of a graphic RAM (GRAM), and while a scanning operation is performed by the GRAM, outputting the command data stored in the GRAM to the control register and refreshing the control register.

18 Claims, 4 Drawing Sheets

METHOD OF AUTOMATICALLY RECOVERING BIT VALUES OF CONTROL REGISTER AND LCD DRIVE INTEGRATED CIRCUIT FOR PERFORMING THE SAME

CROSS-REFERENCE TO RELATED PATENT APPLICATION

This application claims priority to Korean Patent Application No. 10-2006-0098645, filed on Oct. 10, 2006, in the Korean Intellectual Property Office, the disclosure of which is incorporated by reference herein in its entirety.

BACKGROUND OF THE INVENTION

1. Technical Field

The present disclosure relates to a Liquid Crystal Display (LCD), and more particularly, to a method of reducing errors in images displayed on the LCD due to external noise, and a LCD drive integrated circuit (IC) for performing the same.

2. Discussion of the Related Art

FIG. 1 is a block diagram of a conventional LCD drive integrated circuit (IC). Referring to FIG. 1, the conventional LCD drive IC includes a graphic RAM (GRAM) 160, a source driver 170, a gate driver 180, a controller 150, and a timing controller 140. The GRAM 160 stores image data transmitted from a host 110. The source driver 170 receives the image data from the GRAM 160 and transmits the data to source lines of a LCD panel 190. The gate driver 180 drives gate lines of the LCD panel 190 on which the image data is displayed. The controller 150 controls input and output of the image from the GRAM 160. The timing controller 140 receives a clock signal from an oscillator 130 and supplies the clock signal adjusted to the controller 150.

When an image is displayed on the LCD panel 190, the controller 150 stores frames of the corresponding image data in the GRAM 160. The image data is transmitted by the host 100. For example, when the LCD panel 190 has a pixel resolution of 240×320, and if a pixel represents 18 bits, nearly 1.4 million bits (i.e., 1,382,400=240×320×18 bits) are stored for each frame of the image by the controller 150 in the GRAM 160. The controller 150 controls the GRAM 160 and the gate driver 180 simultaneously, so that image data corresponding to a horizontal line of the LCD panel 190 is outputted to the source driver 170 from the GRAM 160 and a scan pulse corresponding to the horizontal line address is outputted from the gate driver 180, respectively.

The gate driver 180 outputs the scan pulse to the LCD panel 190 and then the source driver 170 outputs the image data to the source line of the LCD panel 190. Such operations are repeatedly performed until image data of one frame is outputted to the LCD panel 190.

In addition, while not illustrated in FIG. 1 in detail, the LCD drive IC includes a plurality of controllers. The controllers can control modules of the LCD drive IC and may include, for example, a GRAM controller, a timing controller, and a gate driver controller. The controllers are electrically connected to a control register. The control register stores commands that correspond to each of the controllers.

FIG. 2 is a diagram schematically illustrating that an electrostatic discharge (ESD) can change data values stored in a control register. The control register includes a flipflop 210, which outputs values stored by a command to a logic circuit 220. The values are command data, and may include, for example, bit values for setting common voltage, bit values for gamma correction, etc.

However, when the LCD drive IC is exposed to external noise such as, electrostatic discharge (ESD) or electromagnetic interference (EMI) while displaying images, the values stored in the control register may change. The changed values may cause a malfunction of the internal logic circuit 220, resulting in the display of abnormal images on the LCD screen.

A method of periodically refreshing bit values stored in the control register by an outside host chip has been used to improve the quality of the displayed image. However, when such a method is used, the life span of the outside host chip is shortened and power consumption is increased for mobile TFT display devices such as, Mobile Phones, Smart Phones, and Portable Media Players.

Thus, there is a need for a method of recovering bits of a control register in a LCD drive IC that does not rely on an outside host, and a LCD drive IC performing the same.

SUMMARY OF THE INVENTION

An exemplary embodiment of the present invention provides a method for automatically recovering bit values of a control register included in a LCD drive integrated circuit (IC) by periodically refreshing the bit values using an inner module rather than an outside host chip so that malfunctions generated due to outside noise such as electrostatic discharge (ESD) or electromagnetic interference (EMI) can be prevented and power consumption needed for refreshing can be decreased. An exemplary embodiment of the present invention also provides an LCD drive integrated circuit (IC) that performs the method.

An exemplary embodiment of the present invention provides a method of automatically recovering bit values of a control register. The method includes storing command data (CMD) inputted from a host in the control register and a portion of a graphic RAM (GRAM), and while a scanning operation is performed by the GRAM, outputting the command data stored in the portion of the GRAM to the control register and refreshing the control register.

The scanning operation performed by the GRAM may be performed on each horizontal line of the GRAM and the control register may be refreshed each time a horizontal line of the GRAM is scanned.

The portion of the GRAM in which the command data is stored may be a separate region apart from a region of the GRAM for storing image data and may be allocated to a last page of the GRAM.

The portion of the GRAM in which the command data is stored may have the same memory capacity as that of the control register and may be address mapped with the control register.

According to an exemplary embodiment of the present invention, there is provided an LCD drive integrated circuit (IC) for recovering a bit value of a control register. The LCD drive IC includes a host interface, a control register and a graphic RAM (GRAM). The host interface receives a write clock (WCK) signal and command data from a host. The host interface transmits the WCK signal and the command data to the control register and the GRAM. The control register and the GRAM each synchronize the command data with the WCK signal. The control register stores the command data and the GRAM stores the command data in a portion of the GRAM. The control register is refreshed by the command data stored in the GRAM while a scanning operation is performed by the GRAM.

The LCD drive IC may further include a GRAM controller which receives a scan clock (SCK) signal from a timing controller to perform the scanning and outputs the SCK signal to the control register, while the scanning operation is performed.

The SCK signal inputted from the timing controller and the WCK signal inputted through the host interface may be inputted to the control register through an OR gate.

The command data inputted from the GRAM and through the host interface, respectively, while the scanning operation is performed by the GRAM, may be inputted to the control register through a multiplexer (MUX).

When a command read signal is inputted from the host, the command data stored in the control register may be read.

The command data transmitted through the host interface may be simultaneously stored in the GRAM and the control register.

BRIEF DESCRIPTION OF THE DRAWINGS

The above and other features of the present invention will become more apparent by describing in detail exemplary embodiments thereof with reference to the attached drawings in which.

DETAILED DESCRIPTION OF EXEMPLARY EMBODIMENTS

Hereinafter, exemplary embodiments of the present invention will be described in detail with reference to the accompanying drawings.

Figure 1:
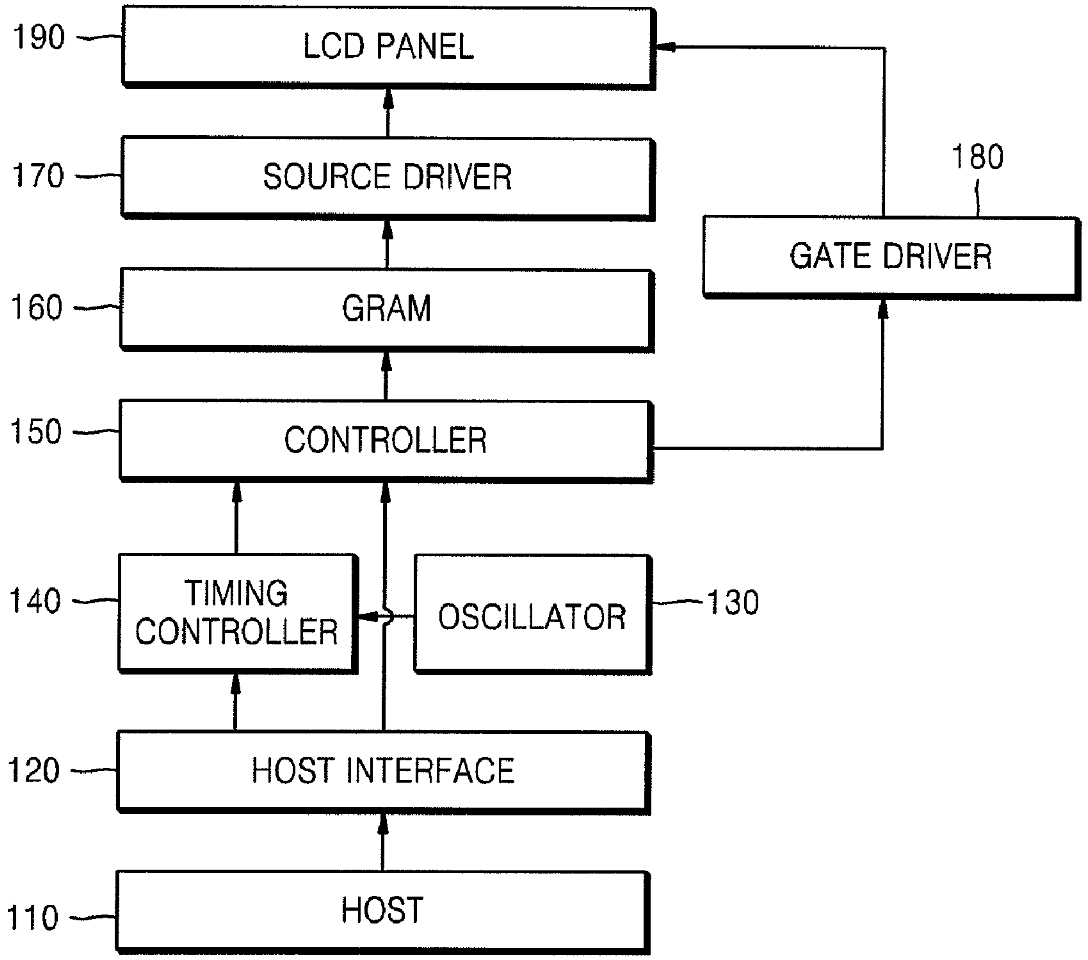
FIG. 1 (PRIOR ART)
FIG. 1 is a block diagram of a conventional LCD drive integrated circuit (IC)
Figure 2:
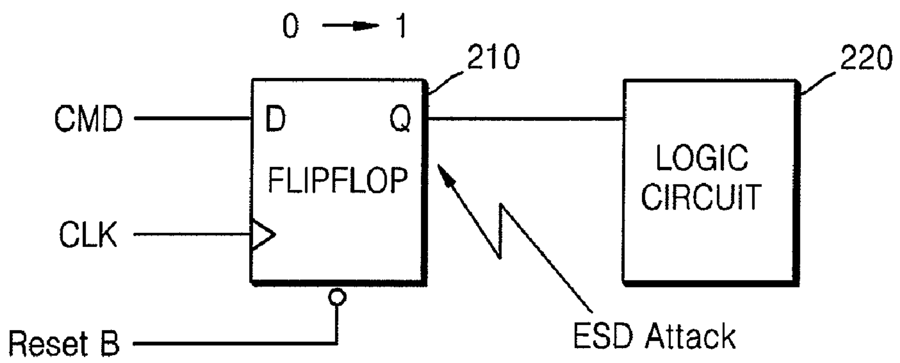
FIG. 2 is a diagram schematically illustrating that data values stored in a control register can be changed due to electrostatic discharge (ESD)
Figure 3:
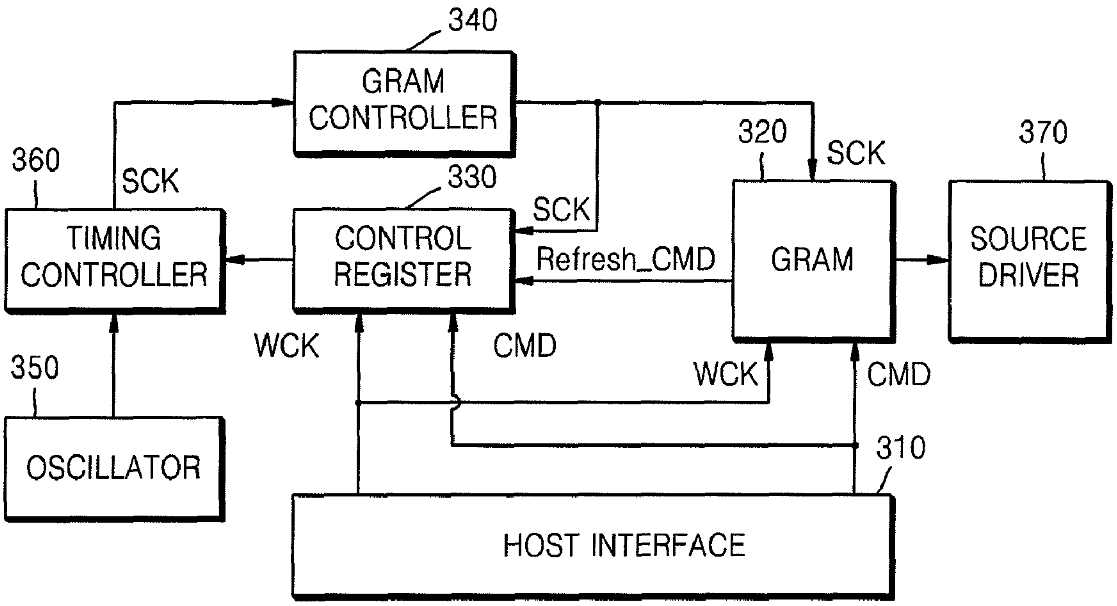
FIG. 3 is a block diagram of an LCD drive IC according to an exemplary embodiment of the present invention.

FIG. 3 is a block diagram of an LCD drive integrated circuit (IC) according to an exemplary embodiment of the present invention. Referring to FIG. 3, the LCD drive IC includes a host interface 310, a graphic RAM (GRAM) 320, a control register 330, a GRAM controller 340, an oscillator 350, a timing controller 360, and a source driver 370.

The host interface 310 receives command data (CMD) and a write clock (WCK) signal from a host (CPU) (not shown) and transmits the CMD and the WCK signal to the LCD drive IC. The CMD and the WCK signal are inputted to the control register 330 and the GRAM 320 through a bus. In addition, the host interface 310 receives image data and transmits the image data to the GRAM 320.

The control register 330 may store data used to control a logic circuit, such as, for example, a GRAM controller 340, or a digital value for controlling an operation of the logic circuit. For example, the control register 330 may store a parameter value for a gamma control or color inversion. The control register 330 receives the CMD and the WCK signal from the host interface 310 and stores the CMD in a plurality of flip-flops (not illustrated) included in the control register 330. The CMD is synchronized with the WCK signal.

According to an exemplary embodiment of the present invention, the GRAM 320 stores image data and a CMD inputted through the host interface 310. The CMD inputted through the host interface 310 is synchronized with the WCK signal, thereby storing the CMD in a portion of the GRAM 320. The portion of the GRAM 320 in which the CMD is stored is a separate region apart from a region in which the image data is stored and thus the GRAM 320 according to the current embodiment of the present invention should have larger memory capacity than that of a conventional GRAM.

The CMD is stored in the GRAM 320 because data stored in the control register 330 may be lost due to external noise such as electrostatic discharge (ESD) or electromagnetic interference (EMI). The GRAM 320 may be formed of a Static RAM (SRAM), which provides better protection against ESD or EMI than the control register 330, which is formed of a Dynamic RAM (DRAM). When the control register 330 is continuously refreshed using the CMD that is stored additionally in the GRAM 320, loss of CMD bit values can be prevented.

It is preferred that the portion of the GRAM 320 in which the CMD is stored have at least the same memory capacity as that of the control register 330. A method of storing the inputted CMD in the portion of the GRAM 320 can be performed using an address mapping method. The portion of the GRAM 320 in which the CMD is stored may be adjusted to have an address that is the same as the control register. A CMD storing method may be performed simultaneously in the control register 330 and the GRAM 320.

The CMD may be inputted from the host immediately after a device having an LCD module is powered on. However, the CMD may be inputted according to a user's instruction. For example, when an image is displayed using a mobile telecommunication terminal and a user wants to change color, brightness, or saturation of the image to be displayed, the CMD may be inputted using a key pad.

The host interface 310 also receives image data from the host and transmits the image data to the GRAM 320. The image data transmitted to the GRAM 320 is transmitted to an LCD panel through the source driver 370 for display.

The GRAM 320 stores image data which corresponds to one frame, and while GRAM scanning is performed, data which corresponds to one line is transmitted to the source driver 370 using a scan clock. For example, in a 240 H×320V pixel resolution LCD panel, data corresponding to 240 pixels is stored in one line.

A method of automatically recovering bit values of the control register 330 according to an exemplary embodiment of the present invention includes refreshing the control register 330 using the CMD stored in the portion of the GRAM 320 while the GRAM 320 is scanned.

During scanning, the GRAM controller 340 receives a scan clock (SCK) signal inputted from the timing controller 360, transmits the SCK signal to the GRAM 320, and controls the GRAM 320 according to the SCK signal to scan each horizontal line of the GRAM 320. In addition, the GRAM controller 340 transmits the SCK signal to the control register 330.

The GRAM 320 that is controlled by the GRAM controller 340 scans image data stored on each horizontal line and outputs data to the source driver 370. In addition, the GRAM 320 sets the CMD stored therein according to the SCK signal and outputs the CMD to the control register 330. The portion of the GRAM 320 in which the CMD is stored exists in horizontal lines of the GRAM 320 and may exist in the last page of the GRAM 320. For example, in a 240 H×320V pixel resolution LCD panel, the GRAM 320 includes 240 pages and thus the portion of the GRAM 320 in which the CMD is stored may exist in the 241st page, which is an additional page.

The scanning operation is performed on each horizontal line of the GRAM 320. In a 240 H×320V pixel resolution LCD panel, the scanning operation is performed 320 times and thus the GRAM 320 outputs the CMD for each of the 320 times of scanning to the control register 330.

The control register 330 receives the SCK signal and the CMD respectively from the GRAM controller 340 and the GRAM 320. The control register 300 synchronizes the CMD with the SCK signal to store the CMD, thereby periodically refreshing the CMD. Even if the CMD stored in the control register 330 is lost due to external noise such as ESD or EMI, the CMD is refreshed in each scanning operation, thereby ensuring stable operation.

Figure 4:
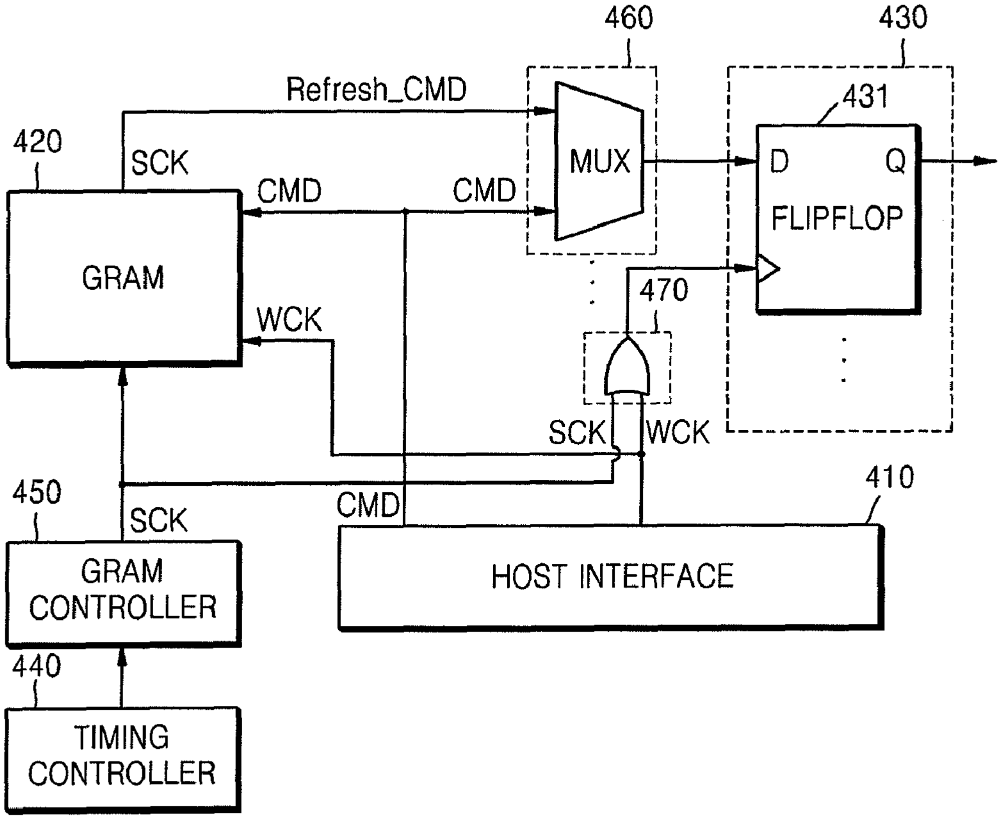
FIG. 4 is a block diagram of an LCD drive IC according to an exemplary embodiment of the present invention.

FIG. 4 is a block diagram of an LCD drive IC according to an exemplary embodiment of the present invention. Referring to FIG. 4, the LCD drive IC includes a host interface 410, a GRAM 420, a control register 430, a timing controller 440, a GRAM controller 450, a MUX 460, and an OR gate 470. The MUX 460 is a logic device to which a CMD and a Refresh_CMD are input, and the OR gate 470 is a logic device to which WCK and SCK signals are input. The other elements are similar to the corresponding ones described above with respect to FIG. 3.

The Refresh_CMD is outputted from the GRAM 420 and inputted to a first input terminal of the MUX 460. The CMD is outputted from the host interface 410 and inputted to a second input terminal of the MUX 460. A predetermined control signal is applied to the MUX 460.

The MUX 460 receives the CMD at the input terminal immediately after the power is switched on. The MUX 460 transmits the CMD, which is inputted to the second input terminal of the MUX 460, to the control register 430, which is formed of a plurality of flipflops 431. Each of the flipflops 431 latches one bit of the CMD.

While the GRAM 420 is scanning, the MUX 460 transmits the Refresh_CMD, which is inputted to the first input terminal of the MUX 460, to the control register 430. Accordingly, the control register 430 latches a refreshed CMD, instead of a previous CMD.

The SCK signal is outputted from the GRAM controller 450 and inputted to a first input terminal of the OR gate 470. The WCK signal is outputted from the host interface 410 and inputted to a second input terminal of the OR gate 470.

The output of the OR gate 470, determined by the input signals SCK and WCK, is applied to a clock input terminal of each of the flipflops 431 of the control register 430. The MUX 460 may be used instead of the OR gate 470 to selectively transmit the SCK signal and the WCK signal to the control register 430.

Figure 5:
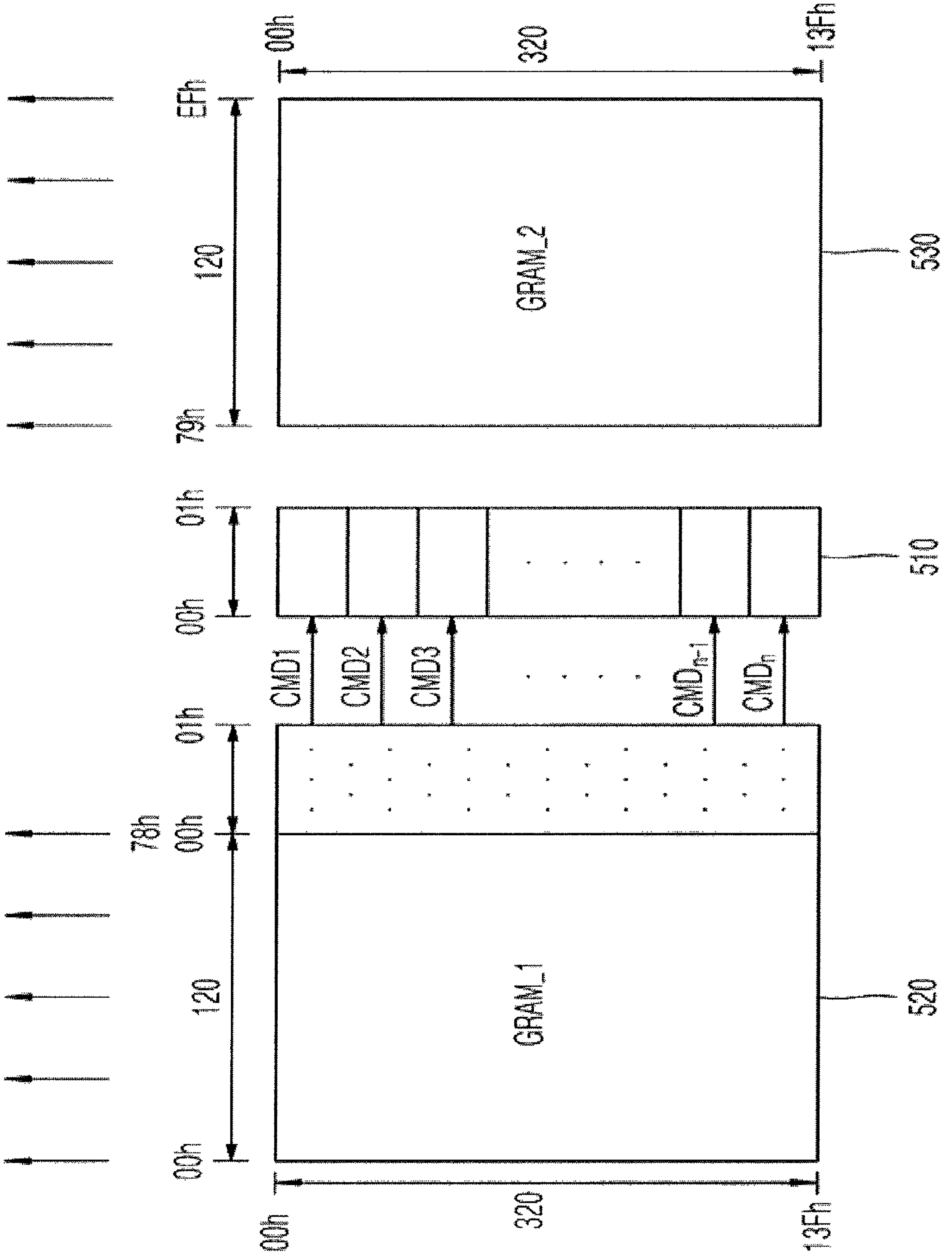
FIG. 5 is a diagram for explaining a method of automatically recovering bit values of a control register according to an exemplary embodiment of the present invention.

FIG. 5 is a diagram for explaining a method of automatically recovering bit values of a control register according to an exemplary embodiment of the present invention. Referring to FIG. 5, it is assumed that GRAMs 520 and 530 supply image data to a 240 H×320V pixel resolution LCD panel and that the GRAMs 520 and 530 have enough memory capacity so that data of one frame can be stored. The GRAMs 520 and 530 are controlled by a GRAM controller (not shown) to effectively supply image data. The GRAMs 520 and 530 may receive CMD from a control register 510 so that each of the GRAMs 520 and 530 may be divided into two with the control register 510 therebetween.

The CMD is inputted through a host interface and stored in a portion of the GRAMs 520 and 530. The CMD may be stored in a portion of the GRAM_1 520 among the GRAMs 520 and 530 and may be set as a separate register data region in the GRAM_1 520. The portion in which the CMD is stored may be set in the last page of the control register 510 or in a column for efficient transmission.

While a scanning operation is performed by the GRAMs 520 and 530, image data stored in the GRAMs 520 and 530 is outputted according to a SCK signal or a horizontal clock signal. The CMD stored in the portion of the GRAM_1 520 may be simultaneously outputted.

The image data outputted from the GRAMs 520 and 530 is inputted to a source driver and the CMD outputted from the GRAM_1 520 is directly inputted to the control register 510. Accordingly, the control register 510 is refreshed each time a horizontal line is scanned.

Figure 6:
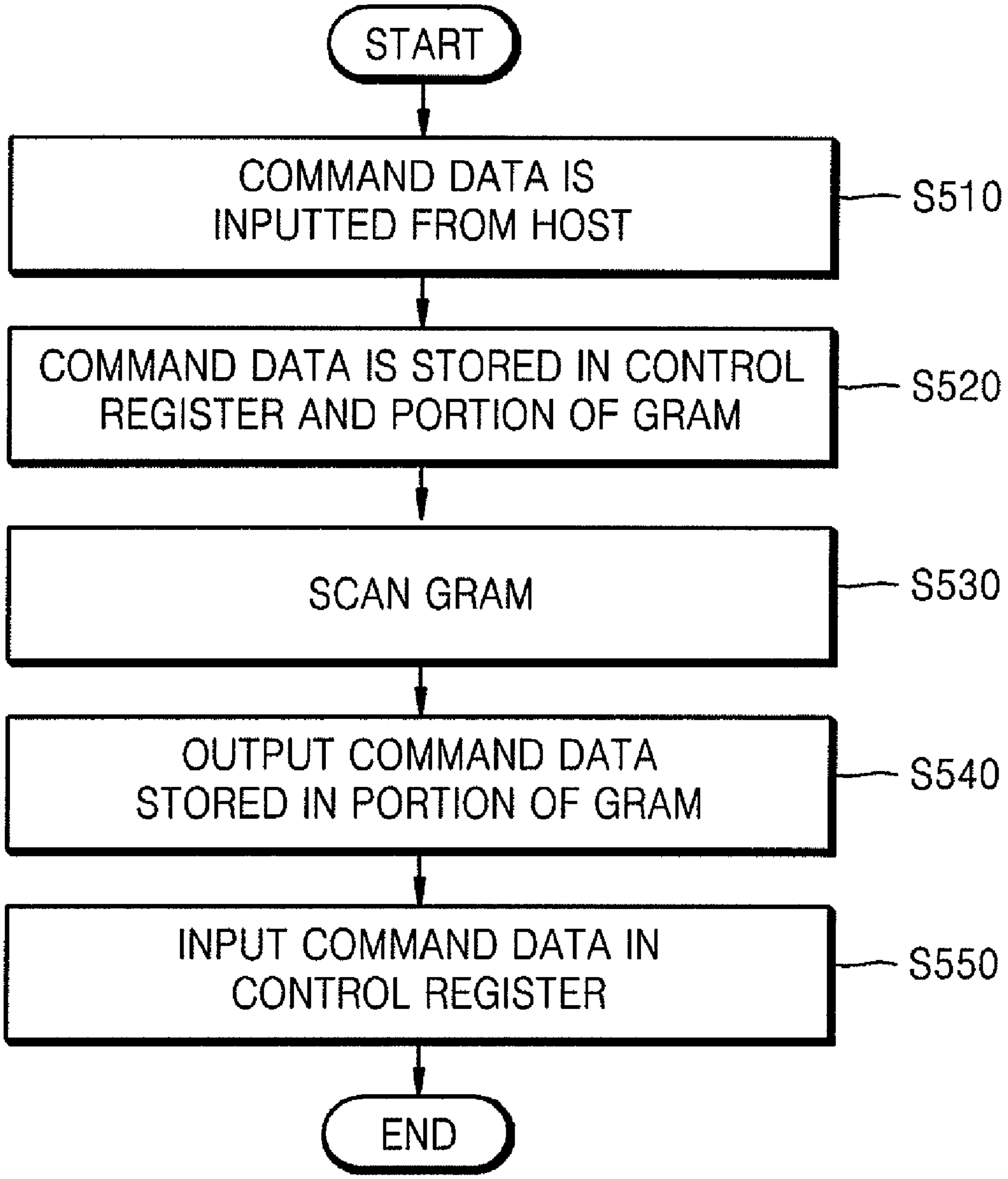
FIG. 6 is a flow chart illustrating a method of automatically recovering bit values of a control register according to an exemplary embodiment of the present invention.

FIG. 6 is a flow chart illustrating a method of automatically recovering bit values of a control register according to an exemplary embodiment of the present invention. CMD is inputted from a host through a host interface (S510). The inputted CMD is stored in the control register and a portion of a GRAM (S520). The CMD may be stored using an address mapping method.

The GRAM is then scanned (S530). A scanning operation of the GRAM is performed on each horizontal line of the GRAM after a SCK signal is inputted through a GRAM controller. While the scanning operation is performed by the GRAM, image data and the CMD stored in the GRAM are outputted (S540). The image data and the CMD may be simultaneously outputted. The outputted CMD is inputted to the control register (S550), thereby refreshing the existing CMD stored in the control register.

At least one embodiment of the present invention provides a method for automatically recovering bit values of a control register and an LCD drive IC for performing the method to periodically refresh CMD stored in the control register according to a SCK signal so that even if data is lost due to external noise such as ESD or EMI, data can be accurately and immediately recovered.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of automatically recovering bit values of a control register within a drive circuit, the method comprising:

storing command data input from a host into the control register and a first part of a graphic RAM (GRAM) of the drive circuit;

transmitting a scan clock signal from a controller of the drive circuit to the GRAM to control the GRAM to perform a scanning operation on each horizontal line of a frame of image data stored within a second part of the GRAM;

outputting from the GRAM the command data stored in the first part to the control register each time the scanning operation is performed; and transmitting the scan clock signal from the controller to the control register to control the control register to refresh its stored command data with the command data output from the GRAM, wherein the control register is refreshed each time a horizontal line of the GRAM is scanned.

2. The method of claim 1, wherein the command data is simultaneously stored in the GRAM and the control register.

3. The method of claim 1, wherein the part of the GRAM in which the command data is stored is a last page of the GRAM.

4. The method of claim 1, wherein the part of the GRAM in which the command data is stored has a same memory capacity as that of the control register.

5. The method of claim 1, wherein the part of the GRAM in which the command data is stored is address mapped with the control register.

6. A liquid crystal display LCD drive integrated circuit (IC) comprising:

a host interface that receives a write clock signal and command data from a host and outputs the write clock signal and the command data;

a controller that outputs a scan clock signal;

a control register that receives the write clock signal, the scan clock signal, and stores the command data;

a graphic RAM (GRAM) that receives the write clock signal, the scanning clock signal, command data, and stores the command data in a first part of the GRAM; and a source driver receiving image data from the GRAM for output to an LCD, wherein a scanning operation is performed on each horizontal line of a frame of image data stored within a second part of the GRAM in response to the scanning clock signal to output the scanned lines to the source driver, and the command data stored in the first part is output to the control register as refresh command data for each scanned line, wherein the control register refreshes its stored command data with the refresh command data in response to the scanning clock signal, and wherein the control register and the GRAM each synchronize the command data they receive with the write clock signal.

7. The LCD drive IC of claim 6, further comprising a timing controller to generate the scan clock signal for output to the controller.

8. The LCD drive IC of claim 7, further comprising an OR gate receiving the scan clock signal and the write clock signal and providing its output as a clock signal to the control register.

9. The LCD drive IC of claim 6, wherein the part of the GRAM in which the command data is stored is a separate region apart from the part of the GRAM for storing the image data.

10. The LCD drive IC of claim 6, wherein the part of the GRAM in which the command data is stored is allocated to a last page of the GRAM.

11. The LCD drive IC of claim 6, wherein the part of the GRAM in which the command data is stored has a same memory capacity as that of the control register.

12. The LCD drive IC of claim 6, wherein the part of the GRAM in which the command data is stored is address mapped with the control register.

13. The LCD drive IC of claim 6, wherein, when a command read signal is inputted from the host, the command data stored in the control register is read.

14. The LCD drive IC of claim 6, wherein the command data transmitted through the host interface is simultaneously stored in the GRAM and the control register.

15. The LCD drive IC of claim 6, further comprising a multiplexer receiving the command data from the host interface and the refresh command data from the GRAM.

16. The LCD drive circuit of claim 6, wherein the first part is distinct from the second part and the GRAM is distinct from the control register.

17. A driving circuit for a display, the driving circuit comprising:

a controller that outputs a scan clock signal;

a control register that receives the scan clock signal and stores command data;

a graphic RAM (GRAM) that receives the scanning clock signal, and stores the command data in a first part of the GRAM; and a source driver receiving image data from the GRAM for output to the display, wherein a scanning operation is performed on each horizontal line of a frame of image data stored within a second part of the GRAM in response to the scanning clock signal to output the scanned lines to the source driver, and the command data stored in the first part is output to the control register as refresh command data for each scanned line, and wherein the control register refreshes its stored command data with the refresh command data in response to the scanning clock signal.

18. The driving circuit of claim 17, wherein the first part is distinct from the second part and the GRAM is distinct from the control register.

* * * * *